(12) United States Patent
Schnellbacher et al.

(10) Patent No.: US 12,464,584 B2
(45) Date of Patent: Nov. 4, 2025

(54) LOW LATENCY EDGE PROCESSING FOR DRONE WIRELESS LINKS

(71) Applicant: T-Mobile USA, Inc., Bellevue, WA (US)

(72) Inventors: George Jason Schnellbacher, Leawood, KS (US); Zheng Fang, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 307 days.

(21) Appl. No.: 18/167,067

(22) Filed: Feb. 9, 2023

(65) Prior Publication Data

US 2024/0276571 A1    Aug. 15, 2024

(51) Int. Cl.
*H04W 76/15* (2018.01)
*H04B 7/26* (2006.01)
*H04L 9/40* (2022.01)

(52) U.S. Cl.
CPC .......... *H04W 76/15* (2018.02); *H04B 7/2606* (2013.01); *H04L 63/0272* (2013.01)

(58) Field of Classification Search
None
See application file for complete search history.

(56) References Cited

U.S. PATENT DOCUMENTS

| | | | |
|---|---|---|---|
| 9,927,807 B1* | 3/2018 | Ganjoo | G08G 5/26 |
| 10,466,700 B1* | 11/2019 | Carmack | G05D 1/101 |
| 10,652,220 B1* | 5/2020 | Ramanujan | H04L 63/0272 |
| 11,079,757 B1* | 8/2021 | Duksta | G05D 1/0022 |
| 2015/0305080 A1* | 10/2015 | Xu | H04L 12/6418 370/329 |
| 2016/0028471 A1* | 1/2016 | Boss | H04W 24/02 455/406 |
| 2017/0295609 A1* | 10/2017 | Darrow | G05D 1/104 |
| 2017/0303123 A1* | 10/2017 | Villar | H04L 67/12 |
| 2018/0213519 A1* | 7/2018 | Liu | H04L 65/40 |
| 2018/0349203 A1* | 12/2018 | Ohta | H04W 92/04 |
| 2019/0103030 A1* | 4/2019 | Banga | G01S 5/0027 |
| 2020/0162434 A1* | 5/2020 | Tang | H04L 69/40 |
| 2020/0162854 A1* | 5/2020 | Wang | H04W 28/0252 |
| 2021/0329460 A1* | 10/2021 | Liao | H04W 12/37 |
| 2021/0392710 A1* | 12/2021 | Yang | H04W 84/005 |
| 2022/0095100 A1* | 3/2022 | Sasi | H04W 12/08 |
| 2023/0403555 A1* | 12/2023 | Farooq | H04W 12/63 |

* cited by examiner

*Primary Examiner* — Otis L Thompson, Jr.
(74) *Attorney, Agent, or Firm* — Foley IP Law, PLLC

(57) ABSTRACT

Solutions for low latency edge processing for unmanned aerial vehicle (UAV, "drone") wireless links (e.g., air interfaces) include: receiving, by a first base station of a cellular network, from a UAV controller, over a first air interface, a first signal; routing the first signal from the first base station to the UAV, over a second air interface, without routing the first signal through a virtual private network (VPN); and controlling a flight parameter of the UAV based on at least the first signal. Further examples include: registering, by a UAV controller, with a cellular network; registering, by a UAV, with the cellular network; transmitting, by the UAV controller, to a first base station of the cellular network, over a first air interface, a first signal; and receiving, by the UAV, from the cellular network, over a second air interface, the first signal, without routing the first signal through a VPN.

20 Claims, 9 Drawing Sheets

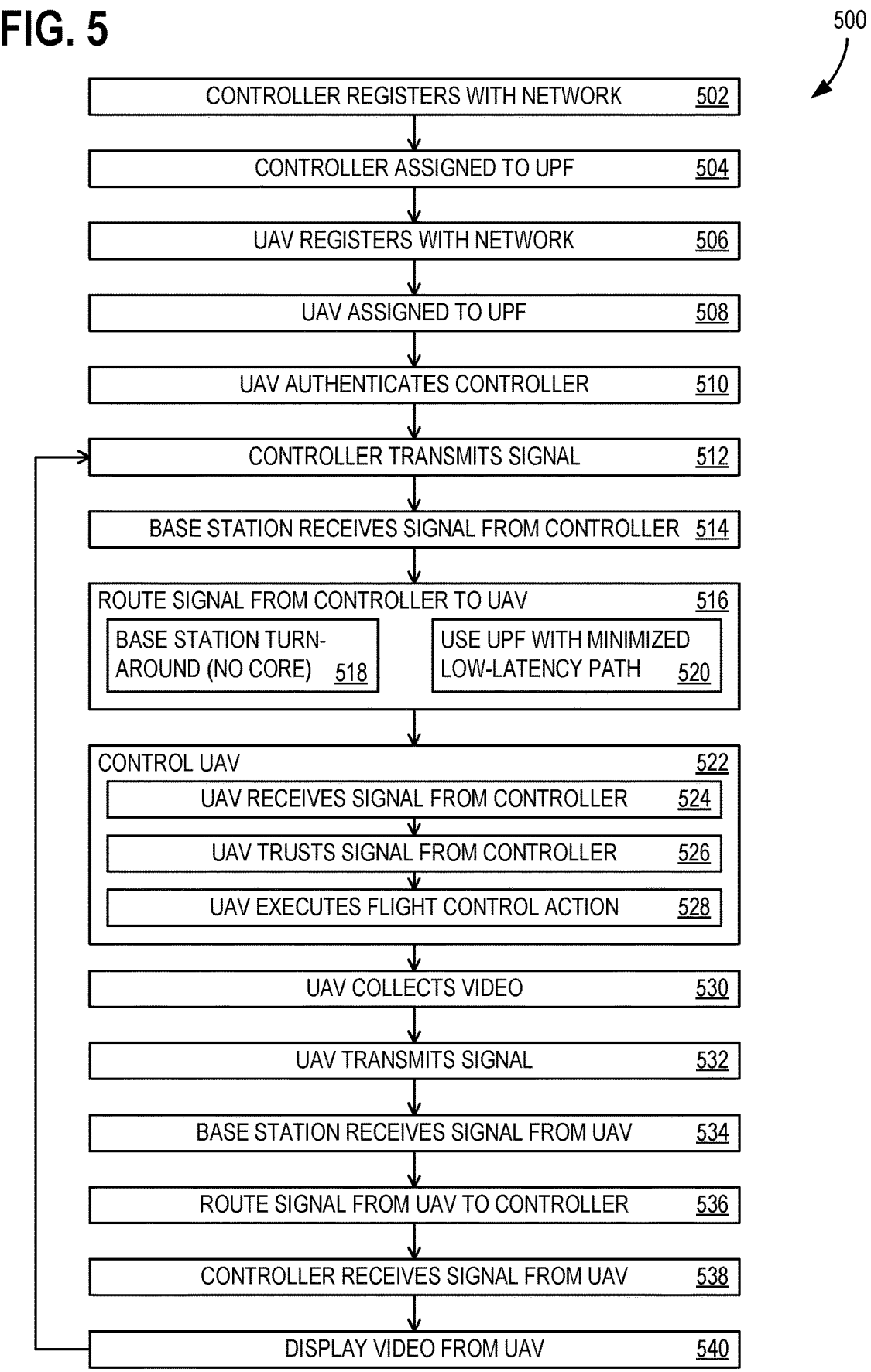

LOW LATENCY EDGE PROCESSING FOR DRONE WIRELESS LINKS

BACKGROUND

Unmanned aerial vehicles (UAVs), also known as drones, are used for both recreation and functional tasks, such as infrastructure inspection. For example, a UAV with a camera may follow an electrical power transmission line, gas or oil pipeline, or water conveyance (e.g., a canal) for miles, in order to perform an inspection. In such scenarios, the radio frequency (RF) wireless link from a human-operated UAV controller to the UAV may be insufficient to enable the UAV to reliably receive command and control signals from the controller or to enable the controller to reliably receive the inspection video signals from the UAV.

SUMMARY

The following summary is provided to illustrate examples disclosed herein, but is not meant to limit all examples to any particular configuration or sequence of operations.

Disclosed solutions for low latency edge processing for unmanned aerial vehicle (UAV, "drone") wireless links (e.g., air interfaces) include: receiving, by a first base station of a cellular network, from a UAV controller, over a first air interface, a first signal: routing the first signal from the first base station to the UAV, over a second air interface, without routing the first signal through a virtual private network (VPN); and controlling a flight parameter of the UAV based on at least the first signal. Further examples include: registering, by a UAV controller, with a cellular network: registering, by a UAV, with the cellular network: transmitting, by the UAV controller, to a first base station of the cellular network, over a first air interface, a first signal; and receiving, by the UAV, from the cellular network, over a second air interface, the first signal, without routing the first signal through a VPN.

BRIEF DESCRIPTION OF THE DRAWINGS

The disclosed examples are described below with reference to the accompanying drawing figures listed below, wherein:

FIGS. 5, 6A, 6B, and 7 illustrate flowcharts of exemplary operations associated with examples of the architecture of FIG. 1.

Figure 1:
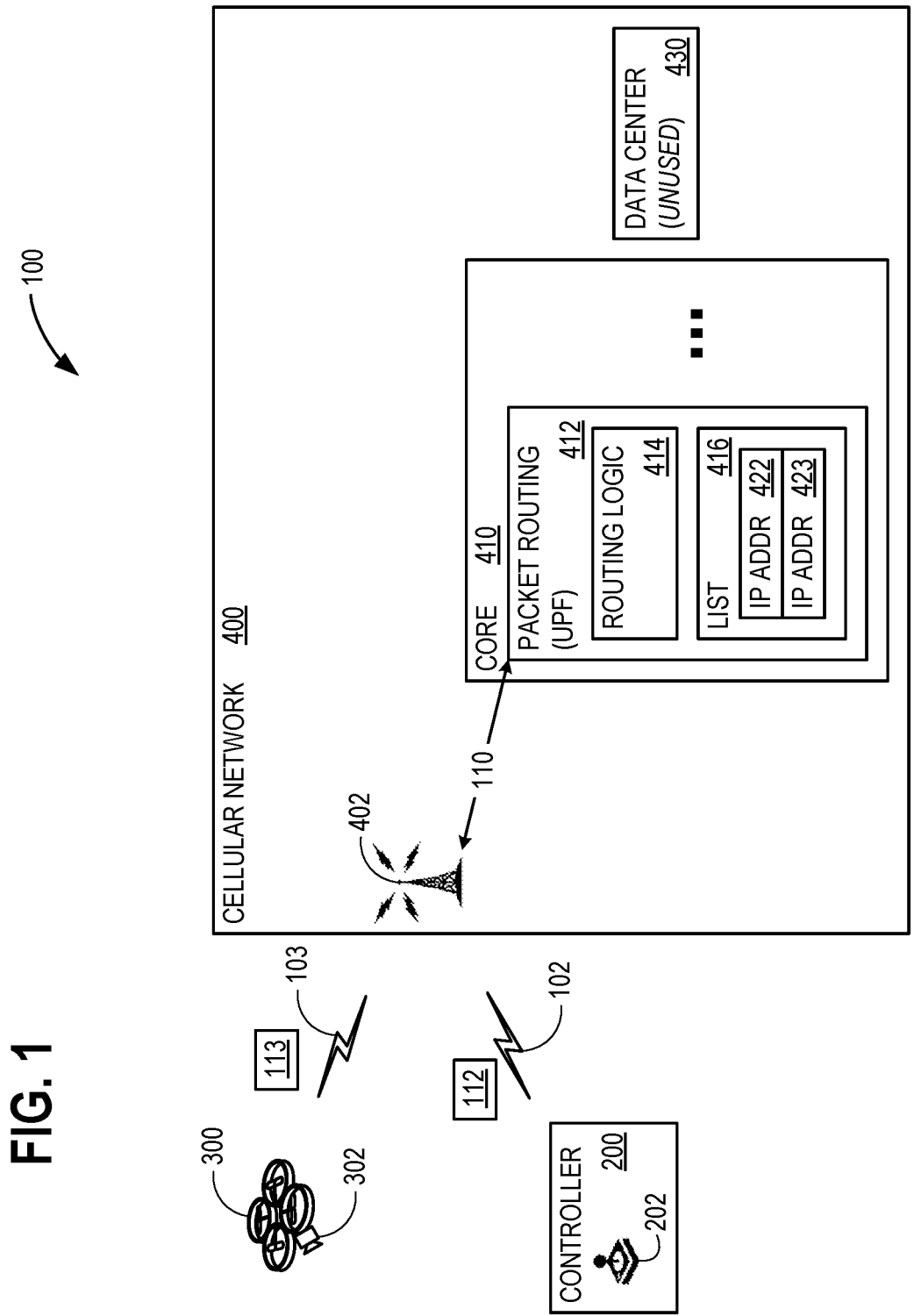
FIG. 1 illustrates an exemplary architecture that advantageously provides low latency edge processing for unmanned aerial vehicle (UAV, "drone") wireless links.

Corresponding reference characters indicate corresponding parts throughout the drawings, where practical. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Disclosed solutions for low latency edge processing for unmanned aerial vehicle (UAV, "drone") wireless links (e.g., air interfaces) include: receiving, by a first base station of a cellular network, from a UAV controller, over a first air interface, a first signal: routing the first signal from the first base station to the UAV, over a second air interface, without routing the first signal through a virtual private network (VPN); and controlling a flight parameter of the UAV based on at least the first signal. Further examples include: registering, by a UAV controller, with a cellular network: registering, by a UAV, with the cellular network: transmitting, by the UAV controller, to a first base station of the cellular network, over a first air interface, a first signal; and receiving, by the UAV, from the cellular network, over a second air interface, the first signal, without routing the first signal through a VPN.

Aspects of the disclosure improve the latency of UAV wireless links when using cellular networks as a relay between the UAV and the UAV controller. That is, the improved cellular network relays signals to/from the UAV in less time. This is accomplished by the cellular network selecting an ultra-low latency path for signaling between the UAV and the UAV controller, for example routing the signaling through only the outer portion of the cellular network core or performing a turn-around within the base station (and avoiding even the network core), and without routing the signals through a VPN. Using only the outer portion of the cellular network core may, for example, be limited to routing the signaling only into (and then back from) a single user plane function (UPF).

Avoiding the use of a VPN advantageously precludes the need to route the signaling through the network core to/from a data center. This reduces latency. Further, a VPN adds networking overhead, so avoiding the use of a VPN increases efficiency of the communication channel between the UAV controller and the UAV.

With reference now to the figures, FIG. 1 illustrates an architecture 100 that advantageously provides low latency edge processing for UAV wireless links. In architecture 100, command and control (and other) signals from a UAV controller 200 going to a UAV 300, as well as video (and other) signals from UAV 300 going to UAV controller 200 pass through a cellular network 400. Cellular network 400 has a base station 402 and a cellular network core 410 that has an edge-disposed packet routing node 412. In some examples, packet routing node 412 comprises a UPF. In some examples, cellular network 400 comprises a fifth generation (5G) standalone architecture (SA) cellular network.

UAV controller 200 communicates with base station 402 (which includes an antenna tower 402a, shown in FIG. 4) using an air interface 102 (a wireless link). UAV controller 200 transmits a signal 112, such as a command and control signal for UAV 300 resulting from a human operating a flight controller 202 of UAV controller 200. UAV controller 200 is shown in further detail in FIG. 2. Upon reception of signal 112, UAV 300 executes a flight control action, such as altering speed, heading, or flight attitude, based on at least signal 112.

Figure 1A:
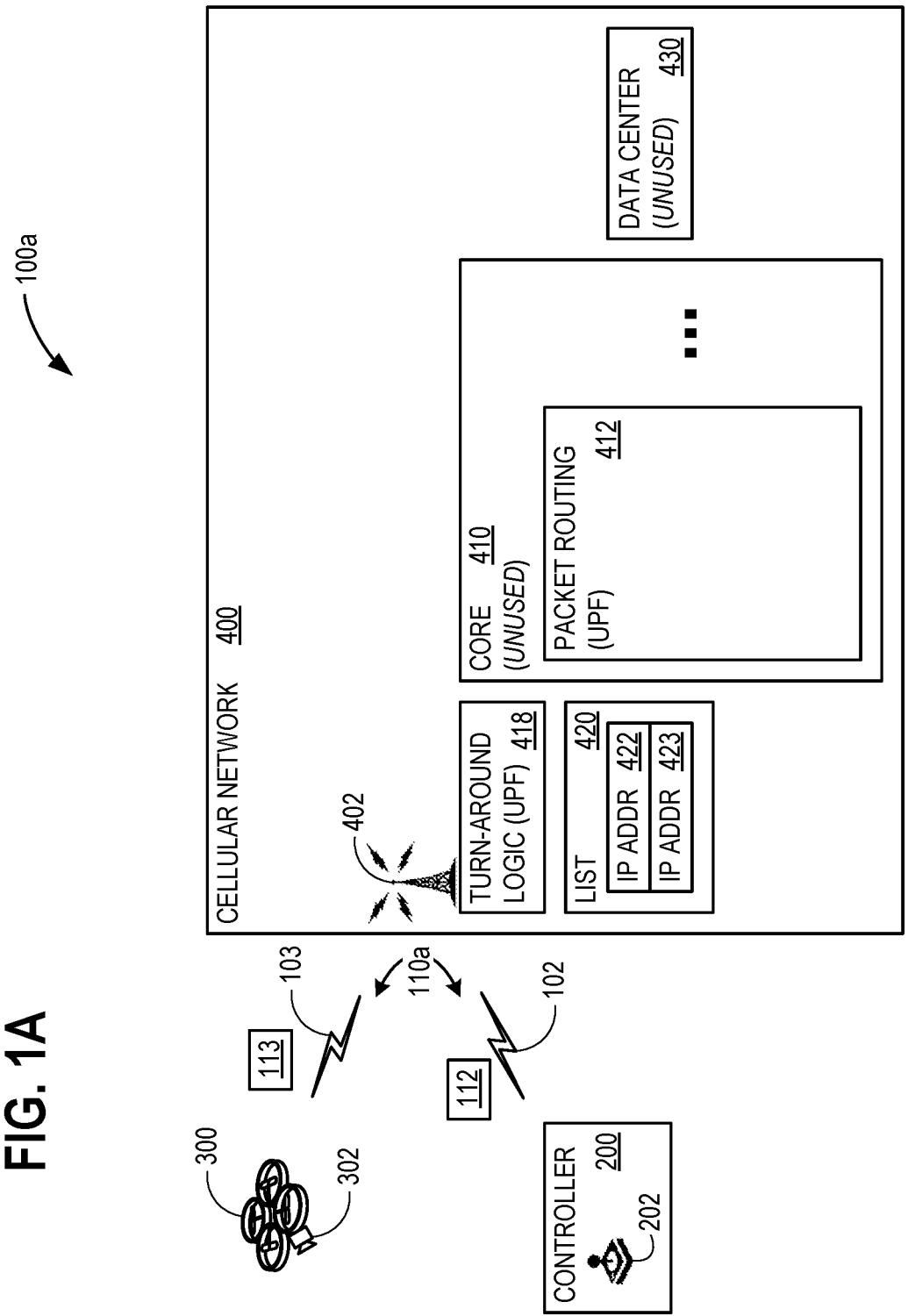
FIG. 1A illustrates an exemplary variation of the architecture of FIG. 1.
Figure 1B:
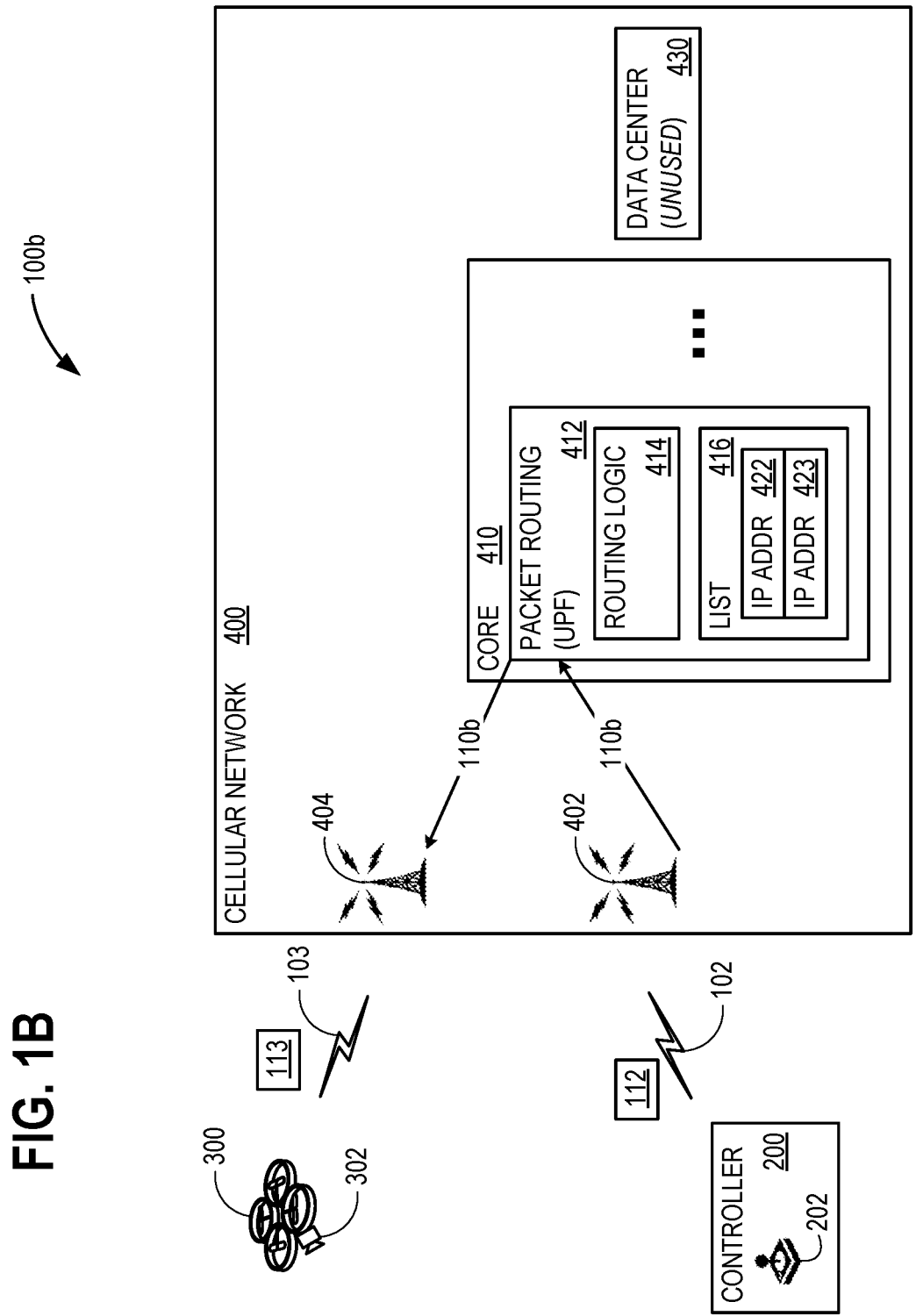
FIG. 1B illustrates another exemplary variation of the architecture of FIG. 1.

UAV 300 communicates with base station 402 (or another base station 404, as shown in FIG. 1B) using an air interface 103 (a wireless link). UAV 300 transmits a signal 113, such as a video signal from a camera 302 carried by UAV 300. UAV 300 is shown in further detail in FIG. 3. Upon reception of signal 113, UAV controller 200 displays the video captured by camera 302 to a human viewer.

Signals 112 and 113 follow a low latency signal path 110 from base station 402 to packet routing node 412, then back to base station 402 without proceeding through the remainder of cellular network core 410, or even reaching a data center 430. If signaling between UAV controller 200 and UAV 300 passed through a VPN, the signal path would need to pass through (or at least into) data center 430, to a server that administered the VPN. This arrangement would introduce latency, which could affect the controllability of UAV 300, However, by avoiding the VPN, the signaling does not need to reach data center 430, and the latency is lower. The ability of UAV 300 to trust incoming command and control signals in the absence of a VPN is addressed in the descriptions of FIGS. 2 and 3.

Packet routing node 412 has routing logic 414 that permits routing of signals 112 and 113. In some examples, signals 112 and 113 use internet protocol (IP) packets, such as IP version 6 (IPv6). In some examples, signals 112 and 113 use peer-to-peer (P2P) protocol. Packet routing node 412 also has a list 416 of IP addresses for devices it is serving. As shown, list 416 includes an IP address 422 for UAV controller 200 and an IP address 423 for UAV 300.

By consulting list 416, which has both IP address 422 for UAV controller 200 and IP address 423 for UAV 300, routing logic 414 is able to identify that incoming signal 112 from base station 402 is to be routed to UAV 300, which is also served by base station 402. Routing logic 414 then routes outgoing signal 112 directly back to base station 402. Thus, signal 112 does not need to pass through further nodes of cellular network core 410.

Similarly, routing logic 414 is also able to identify that incoming signal 113 from base station 402 is to be routed to UAV controller 200, which is also served by base station 402. Routing logic 414 then routes outgoing signal 113 directly back to base station 402. Thus, signal 113 does not need to pass through further nodes of cellular network core 410.

FIG. 1A illustrates an exemplary variation of architecture 100, shown as architecture 100a, in which both UAV controller 200 and UAV 300 are both served by a common base station. In architecture 100a, the functionality of routing logic 414 is also placed into base station 402 as turn-around logic 418, and list 416 of IP addresses served by packet routing node 412 has a counterpart of list 420 of IP addresses served by base station 402. In some examples, turn-around logic 418 comprises UPF functionality, so that base station 402 has a co-located UPF (or an integrated UPF) that precludes the need for routing signals away from the location of base station 402.

Since, in architecture 100a, base station 402 serves both UAV controller 200 and UAV 300, both IP address 422 for UAV controller 200 and IP address 423 for UAV 300 are on list 420. By consulting list 420, routing logic 414 is able to identify that incoming signal 112, from air interface 120, is to be routed to UAV 300. Routing logic 414 then routes outgoing signal 112 directly out through air interface 130 without entering cellular network core 410. Similarly, routing logic 414 is also able to identify that incoming signal 113, from air interface 120, is to be routed to UAV controller 200. Routing logic 414 then routes outgoing signal 113 directly out through air interface 120 without entering cellular network core 410.

Thus, in architecture 100a, signals 112 and 113 follow a low latency signal path 110a only into base station 402 without even proceeding to packet routing node 412. In some scenarios, this may be referred to as a "local breakout" condition.

FIG. 1B illustrates an exemplary variation of architecture 100 (not architecture 100a), shown as architecture 100b, in which UAV controller 200 and UAV 300 are served by different base stations that are each in communication with the same packet routing node. In architecture 100b, UAV controller 200 is served by base station 402 and UAV 300 is served by a base station 404 that hosts air interface 103. Architecture 100b may be used when UAV 300 has flown such a distance from UAV controller 200, such as five miles or more for example, that UAV 300 has been handed off to a different base station than the base station serving UAV controller 200.

For example, the configuration may start as that of architecture 100 or 100a with both UAV controller 200 and UAV 300 being served by base station 402. However, when UAV 300 has flown a sufficient distance that it is handed off to base station 404, the configuration changes to that of architecture 100b. When UAV 300 returns to the vicinity of UAV controller 200, the configuration may return to that of architecture 100 or 100a.

In architecture 100b, routing logic 414 is able to identify that incoming signal 112 from base station 402 is to be routed to UAV 300, which is served by base station 404. Routing logic 414 then routes outgoing signal 112 to base station 404, and signal 112 does not need to pass through further nodes of cellular network core 410. Similarly, routing logic 414 is also able to identify that incoming signal 113 from base station 404 is to be routed to UAV controller 200, which is served by base station 402. Routing logic 414 then routes outgoing signal 113 to base station 402, and signal 113 does not need to pass through further nodes of cellular network core 410.

Signals 112 and 113 follow a low latency signal path 110b from base station 402 to/from packet routing node 412 and to/from base station 404, without proceeding through the remainder of cellular network core 410. Further references to architecture 100 may also be construed as also referring to architecture 100a or 100b, except as noted.

Figure 2:
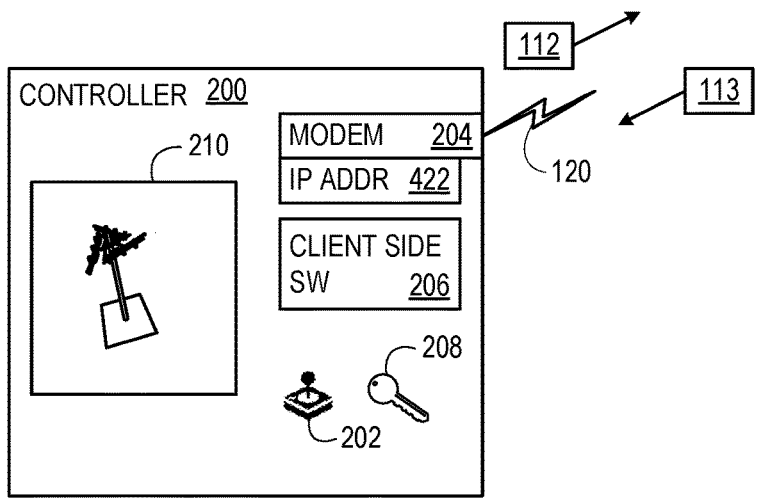
FIG. 2 illustrates further detail for the UAV controller of FIG. 1.

FIG. 2 illustrates further detail for UAV controller 200. UAV controller 200 has a cellular modem 204, which has IP address 422, and in some examples, is configured for 5G SA. UAV controller 200 also has client side software 206, authentication functionality 208, flight controller 202, and a video display 210 that displays video signals received from UAV 300.

Figure 3:
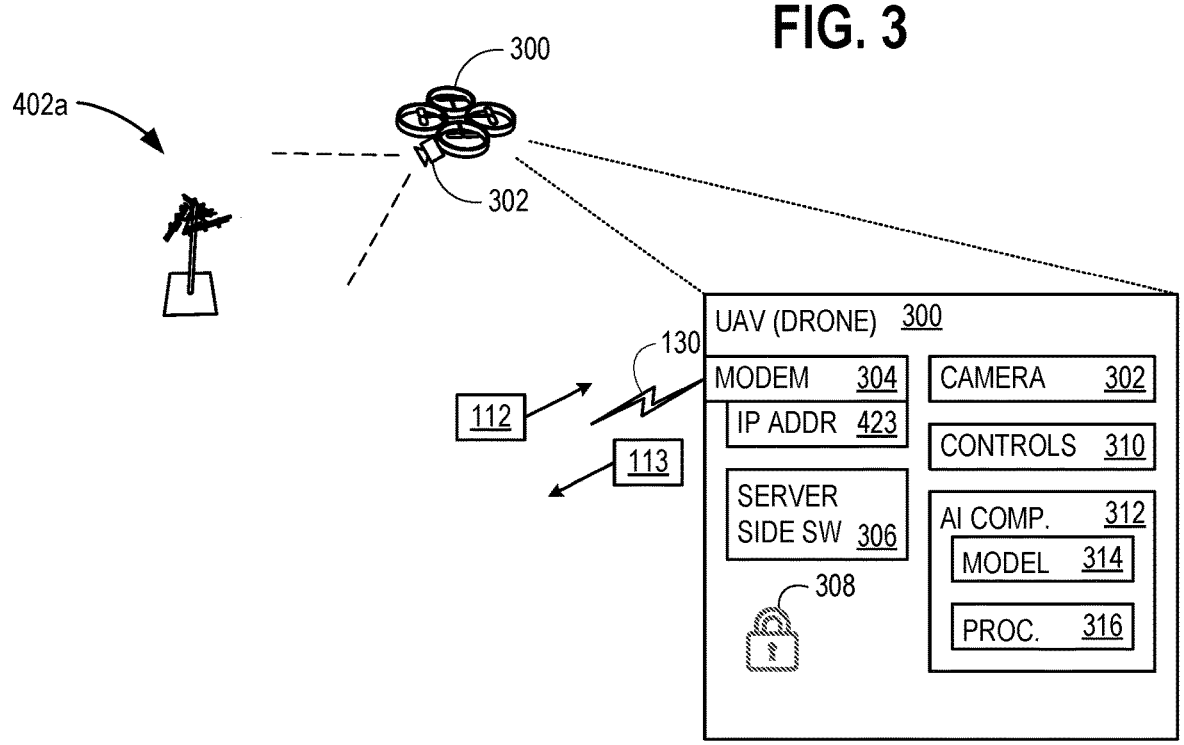
FIG. 3 illustrates further detail for the UAV of FIG. 1.

FIG. 3 illustrates further detail for UAV 300. UAV 300 has a cellular modem 304, which has IP address 423, and in some examples, is configured for 5G SA. UAV 300 also has server side software 306, authentication functionality 308, and flight controls 310 such as rotors and flaps, for example, that are able to transform a command and control signal into a flight change. As illustrated, camera 302 has a view of antenna tower 402a of base station 402. The video stream captured by camera 302 is displayed in video display 210 on UAV controller 200.

By setting up UAV 300 and UAV controller 200 in a client-server relationship, with UAV 300 acting in the server role and UAV controller 200 acting in a client role, and leveraging authentication functionality 208 and 308, UAV controller 200 is able to authenticate itself to UAV 300. This enables UAV 300 to trust signal 112 from UAV controller 200. Without a trust mechanism, there is a possibility that a malicious actor could attempt to wrest control of UAV 300 from UAV controller 200. A VPN provides a trusted channel, whereas the illustrated authentication mechanism permits endpoint trust on an otherwise untrusted channel. UAV 300 is then able to reject any purported command and control signals coming from a non-authenticated source—without the need for a VPN.

Some examples of UAV 300 also include an artificial intelligence (AI) component 312. As used herein, AI includes machine learning (ML). AI component 312 has an AI model 314 and a processor 316. In some examples, processor 316 comprises one or more computing devices 800 of FIG. 8. In some examples, AI component 312 provides navigation functionality such as collision avoidance, and/or autonomous or semi-autonomous flight control when signal 112 is absent.

Figure 4:
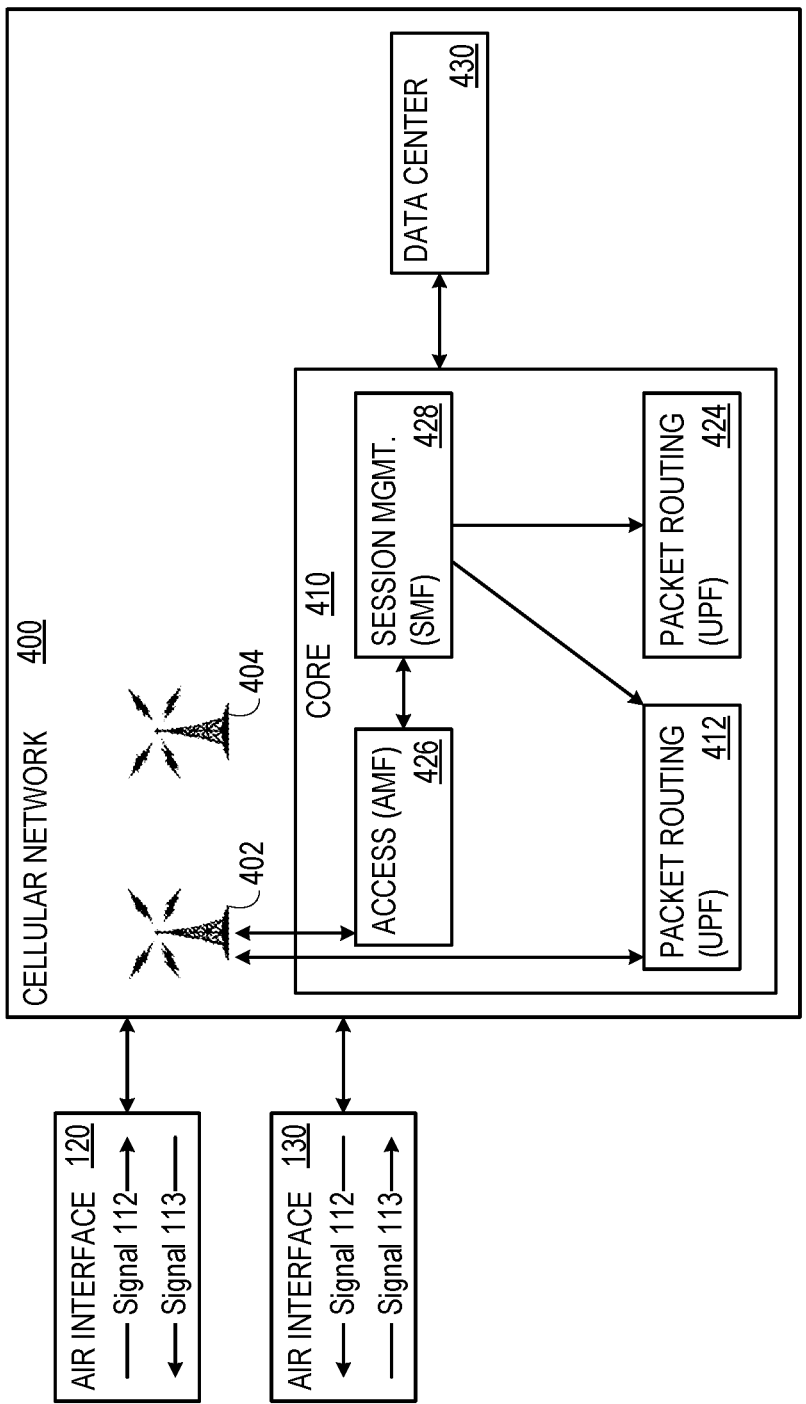
FIG. 4 illustrates further detail for the cellular network of FIG. 1.

FIG. 4 illustrates further detail for cellular network 400. Cellular network 400 receives signal 112 from UAV controller 200 via air interface 120 and transmits signal 112 to UAV 300 via air interface 130. Cellular network 400 receives signal 113 from UAV 300 via air interface 130 and transmits signal 113 to UAV controller 200 via air interface 120. Cellular network 400 has multiple base stations, including base stations 402 and 404, and cellular network core 410. In 5G examples, each of base stations 402 and 404 comprises a gNodeB (gNB). A cellular network core sits between the radio access network (RAN), which includes the base stations (e.g., base stations 402 and 404) and external networks and performs packet-switching and routing functions for services, including voice calls, text messages, and mobile data.

Cellular network core 410 has multiple packet routing nodes, including edge-disposed packet routing node 412 and another packet routing node 424; access nodes, including an access node 426; and at least one session management node, such as session management node 428. In some examples, for example 5G environments, packet routing nodes 412 and 424 comprise UPFs, access node 426 comprises an access and mobility function (AMF), and session management node 428 comprises a session management function (SMF).

Each of base stations 402 and 404 is in communication with both access node 426 and packet routing nodes 412 and 424. Access node 426 is further in communication with session management node 428. Session management node 428 assigns devices registering with cellular network 400 to a specific packet routing node, often based on physical location and/or data traffic type.

Both UAV controller 200 and UAV 300 register with cellular network 400, such as via cellular modem 204 of UAV controller 200 and cellular modem 304 of UAV 300 registering with session management node 428. In cellular network 400, control plane signals (e.g., registration and session initiation and termination) flow from base station 402 or 404, through access node 426, to session management node 428. When UAV controller 200 and UAV 300 register with cellular network 400, they identify themselves as IP traffic devices and request an IP protocol session (e.g., IPv6). Because they both request the same type of service and are both served by the same base station 402 (or one is served by nearby base station 404), UAV controller 200 and UAV 300 are both assigned to the same packet routing node 412. In some examples, UAV controller 200 and UAV 300 may specifically request a low latency service, such as when specifying a requested quality of service (Qos), so that session management node 428 assigns UAV controller 200 and UAV 300 to edge-disposed packet routing node 412, rather than packet routing node 424 which may not be located so favorably and thus introduce more latency.

FIG. 5 illustrates a flowchart 500 of exemplary operations associated with examples of architecture 100. In some examples, at least a portion of flowchart 500 is performed using one or more computing devices 800 of FIG. 8. Flowchart 500 commences with UAV controller 200 registering with base station 402 and cellular network 400 in operation 502. In operation 504, cellular network 400 assigns packet routing node 412 to handle data traffic for UAV controller 200. UAV 300 registers with base station 402 and cellular network 400 in operation 506. In operation 508, cellular network 400 assigns packet routing node 412 to handle data traffic for UAV 300.

UAV 300 acts in a role as a server relative to UAV controller 200 and UAV controller 200 acts in a role as a client relative to UAV 300, so in operation 510, UAV 300 authenticates UAV controller 200. UAV 300 will now be able to trust signaling from UAV controller 200 (e.g., signal 112). In operation, 512 UAV controller 200 transmits signal 112 (e.g., a command and control signal for UAV 300) to base station 402 of cellular network 400 over air interface 102. Base station 402 receives signal 112 from UAV controller 200, over air interface 102, in operation 514.

Signal 112 is routed from base station 402 to UAV 300 over air interface 103, without routing signal 112 through a VPN, in operation 516, which may be accomplished by either operation 518 or 520. Operation 518 routes signal 112 from base station 402 directly to UAV 300 without entering cellular network 400 core. This is feasible when air interface 103 is also hosted by base station 402. Operation 520 routes signal 112 from base station 402 through a single packet routing node (e.g., a UPF) before reaching the base station hosting air interface 103. In some examples, the base station hosting air interface 103 is base station 402, although in some other examples, the base station hosting air interface 103 is instead base station 404. Both operations 518 use a low latency path, for example path 110a for operation 518 or path 110 or 110b for operation 520.

Operation 522 controls a flight parameter of UAV 300 based on at least signal 112. This is accomplished using operations 524-528. UAV 300 receives signal 112 in operation 524, and in operation 526, UAV 300 trusts signal 112 based on at least authenticating UAV controller 200 (e.g., UAV 300 flags signal 112 as a trusted signal or processes it for action rather than discarding it). In operation 528, UAV 300 executes a flight control action based on at least signal 112.

UAV 300 collects video with camera 302 in operation 530 and in operation 532, transmits signal 113 (e.g., the collected video) to the base station 404 hosting air interface 103 (e.g., base station 402 or 404). In operation 534, the base station hosting air interface 103 receives signal 113 from UAV 300. Operation 536 routes signal 113 to base station 402 using a reverse route of signal 112 (e.g., path 110, 110a, or 110b) and routes signal 113 to UAV controller 200 over air interface 102.

In operation 538 UAV controller 200 receives signal 113 from cellular network 400 over air interface 102, without signal 113 having been routed through a VPN. In operation 540, video display 210 displays video captured by camera 302 and sent as signal 113. Flowchart 500 then returns to operation 512 to continue UAV 300 flying under the control of UAV controller 200 and providing video.

Figure 6A:
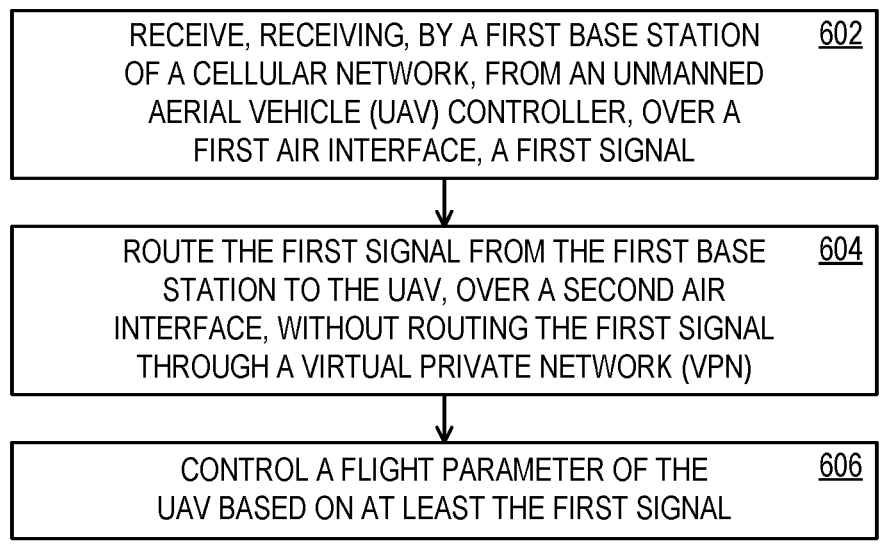

FIG. 6A illustrates a flowchart 600 of exemplary operations associated with examples of architecture 100. In some examples, at least a portion of flowchart 600 may be performed using one or more computing devices 800 of FIG. 8. Flowchart 600 commences with operation 602, which includes receiving, by a first base station of a cellular network, from a UAV controller, over a first air interface, a first signal. Operation 604 includes routing the first signal from the first base station to the UAV, over a second air interface, without routing the first signal through a VPN. Operation 606 includes controlling a flight parameter of the UAV based on at least the first signal.

Figure 6B:
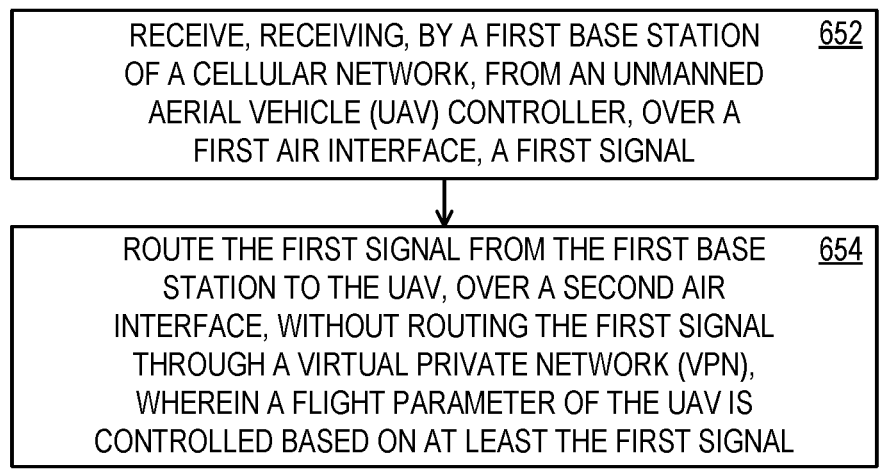

FIG. 6B illustrates a flowchart 650 of exemplary operations associated with examples of architecture 100. In some examples, at least a portion of flowchart 650 may be performed using one or more computing devices 800 of FIG. 8. Flowchart 650 commences with operation 652, which includes receiving, by a first base station of a cellular network, from a UAV controller, over a first air interface, a first signal. Operation 654 includes routing the first signal from the first base station to the UAV, over a second air interface, without routing the first signal through a VPN, wherein a flight parameter of the UAV is controlled based on at least the first signal.

Figure 7:
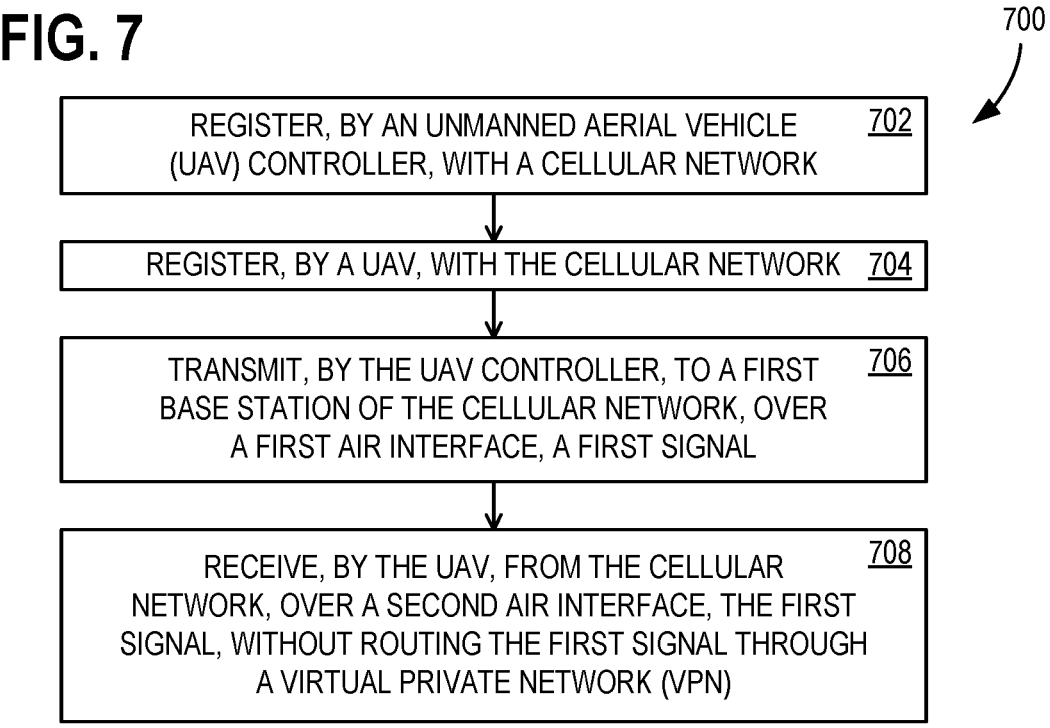

FIG. 7 illustrates a flowchart 700 of exemplary operations associated with examples of architecture 100. In some examples, at least a portion of flowchart 700 may be performed using one or more computing devices 800 of FIG. 8. Flowchart 700 commences with operation 702, which includes registering, by a UAV controller, with a cellular network. Operation 704 includes registering, by a UAV, with the cellular network.

Operation 706 includes transmitting, by the UAV controller, to a first base station of the cellular network, over a first air interface, a first signal. Operation 708 includes receiving, by the UAV, from the cellular network, over a second air interface, the first signal, without routing the first signal through a VPN.

Figure 8:
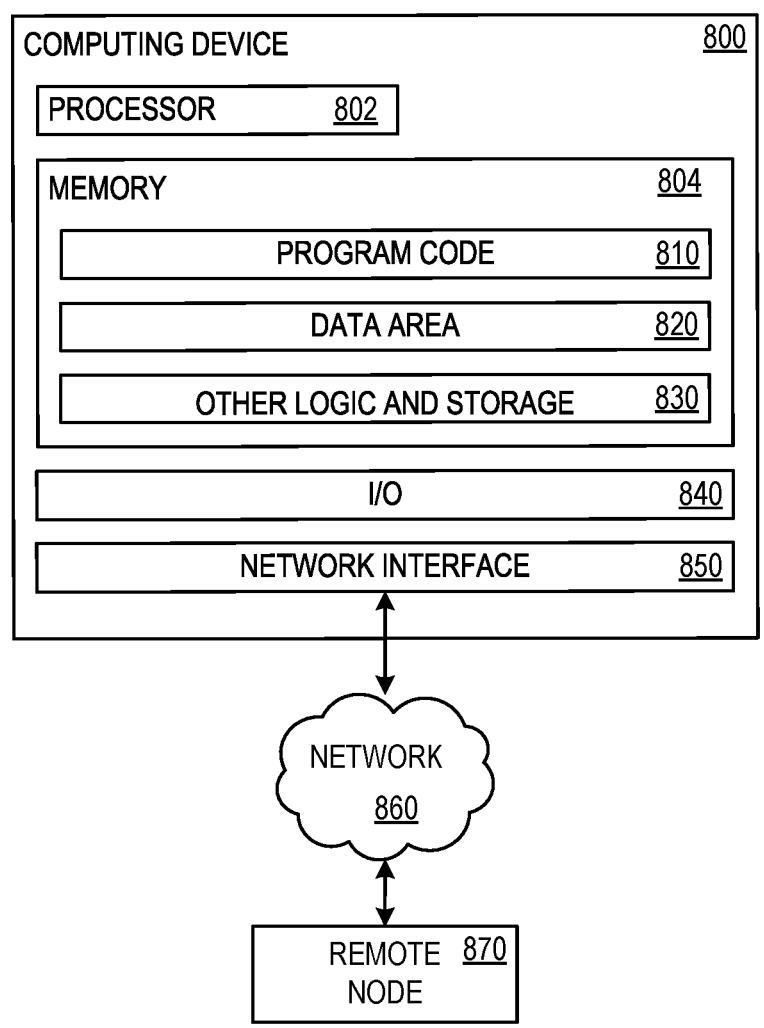
FIG. 8 illustrates a block diagram of a computing device suitable for implementing various aspects of the disclosure.

FIG. 8 illustrates a block diagram of computing device 800 that may be used as any component described herein that may require computational or storage capacity. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including any instructions necessary to perform operations described herein. Data area 820 holds any data necessary to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over a network 860 with a remote node 870, which may represent another implementation of computing device 800. For example, a remote node 870 may represent another of the above-noted nodes within architecture 100.

ADDITIONAL EXAMPLES

A method of edge processing comprises: receiving, by a first base station of a cellular network, from a UAV controller, over a first air interface, a first signal; and routing the first signal from the first base station to the UAV, over a second air interface, without routing the first signal through a VPN, wherein a flight parameter of the UAV is controlled based on at least the first signal.

A system for edge processing comprises: a processor; and a computer-readable medium storing instructions that are operative upon execution by the processor to: receive, receiving, by a first base station of a cellular network, from a UAV controller, over a first air interface, a first signal; and route the first signal from the first base station to the UAV, over a second air interface, without routing the first signal through a VPN, wherein a flight parameter of the UAV is controlled based on at least the first signal.

One or more example computer storage devices has computer-executable instructions stored thereon, which, upon execution by a computer, cause the computer to perform operations comprising: receiving, by a first base station of a cellular network, from a UAV controller, over a first air interface, a first signal: routing the first signal from the first base station to the UAV, over a second air interface, without routing the first signal through a VPN, wherein a flight parameter of the UAV is controlled based on at least the first signal.

Another method of edge processing comprises: registering, by a UAV controller, with a cellular network: registering, by a UAV, with the cellular network; transmitting, by the UAV controller, to a first base station of the cellular network, over a first air interface, a first signal; and receiving, by the UAV, from the cellular network, over a second air interface, the first signal, without routing the first signal through a VPN.

A system for edge processing comprises: a processor; and a computer-readable medium storing instructions that are operative upon execution by the processor to: register, by a UAV controller, with a cellular network: register, by a UAV, with the cellular network; transmit, by the UAV controller, to a first base station of the cellular network, over a first air interface, a first signal; and receive, by the UAV, from the cellular network, over a second air interface, the first signal, without routing the first signal through a VPN.

One or more additional example computer storage devices has computer-executable instructions stored thereon, which, upon execution by a computer, cause the computer to perform operations comprising: registering, by a UAV controller, with a cellular network; registering, by a UAV, with the cellular network: transmitting, by the UAV controller, to a first base station of the cellular network, over a first air interface, a first signal; and receiving, by the UAV, from the cellular network, over a second air interface, the first signal, without routing the first signal through a VPN.

Alternatively, or in addition to the other examples described herein, examples include any combination of the following:
- the first signal comprises a command and control signal for the UAV;
- routing the first signal from the first base station to the UAV comprises routing the first signal from the first base station directly to the UAV without entering a cellular network core, wherein the second air interface is hosted by the first base station;
- routing the first signal from the first base station to the UAV comprises routing the first signal from the first base station through a single UPF before reaching the base station hosting the second air interface;
- the cellular network comprises a 5G SA cellular network;
- authenticating, by the UAV, the UAV controller;

based on at least authenticating the UAV controller, trusting, by the UAV, the first signal.
receiving, by a base station hosting the second air interface, from the UAV, a second signal;
routing the second signal to the first base station using a reverse route of the first signal;
routing the second signal to the UAV controller over the first air interface;
registering, by the UAV controller, with the cellular network;
the UAV controller has a cellular modem configured for 5G SA;
assigning, by the cellular network, a UPF to handle data traffic for the UAV controller;
registering, by the UAV, with the cellular network;
the UAV has a cellular modem configured for 5G SA;
assigning, by the cellular network, the UPF to handle data traffic for the UAV;
the UAV acts in a role as a server relative to the UAV controller;
the UAV controller acts in a role as a client relative to the UAV;
the first base station comprises a gNB;
the base station hosting the second air interface comprises the first base station;
the base station hosting the second air interface does not comprise the first base station;
the base station hosting the second air interface comprises a gNB;
the first signal uses IPv6;
the first signal uses P2P protocol;
the second signal uses IPv6;
the second signal uses P2P protocol;
the second signal comprises a video signal;
transmitting, by the UAV controller, to a first base station of the cellular network, over a first air interface, a first signal;
receiving, by the UAV, from the cellular network, over a second air interface, the first signal, without routing the first signal through a VPN.
transmitting, by the UAV, to a base station of the cellular network, over the second air interface, a second signal; and
receiving, by the UAV controller, from the cellular network, over the first air interface, the second signal, without routing the second signal through a VPN.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of edge processing, the method comprising:
receiving, by a base station of a cellular network, an unmanned aerial vehicle (UAV) command and control signal over a first air interface extending between the base station and a UAV controller, the UAV command and control signal carrying instructions for controlling a flight parameter of a UAV; and
transmitting, by the base station, the UAV command and control signal over a second air interface extending between the base station and the UAV without routing the UAV command and control signal through a cellular network core of the cellular network, the UAV authenticating the UAV controller before using the UAV command and control signal to control the flight parameter of the UAV.

2. The method of claim 1, wherein the cellular network comprises a fifth generation (5G) standalone architecture (SA) cellular network.

3. The method of claim 1, further comprising:
authenticating, by the UAV, the UAV controller; and
based on at least authenticating the UAV controller, trusting, by the UAV, the UAV command and control signal.

4. The method of claim 1, further comprising:
receiving, by the base station, a signal from the UAV over the second air interface; and
transmitting, by the base station, the signal to the UAV controller over the first air interface.

5. The method of claim 1, wherein the base station is located within a cellular radio access network (RAN) of the cellular network that interconnects to the cellular network core of the cellular network.

6. The method of claim 5, wherein the UAV command and control signal is routed exclusively within the cellular RAN after being received over the first air interface and prior to being transmitted over the second air interface.

7. The method of claim 5, wherein a signaling path of the UAV command and control signal extends through the cellular RAN and bypasses the cellular network core.

8. A system for edge processing, the system comprising:
a processor; and
a computer-readable medium storing computer-executable instructions that, upon execution by the processor, cause the system to perform the following operations:
receiving, by a base station of a cellular network, an unmanned aerial vehicle (UAV) command and control signal over a first air interface extending between the base station and a UAV controller, the UAV command and control signal carrying instructions for controlling a flight parameter of a UAV; and
transmitting, by the base station, the UAV command and control signal over a second air interface extending between the base station and the UAV without routing the UAV command and control signal through a cellular network core of the cellular network, the UAV authenticating the UAV controller before using the UAV command and control signal to control the flight parameter of the UAV.

9. The system of claim 8, wherein the cellular network comprises a fifth generation (5G) standalone architecture (SA) cellular network.

10. The system of claim 8, wherein the operations further comprise:
authenticating, by the UAV, the UAV controller; and
based on at least authenticating the UAV controller, trusting, by the UAV, the UAV command and control signal.

11. The system of claim 8, wherein the operations are further operative to:
receiving, by the base station, a signal from the UAV over the second air interface; and
transmitting, by the base station, the signal to the UAV controller over the first air interface.

12. The system of claim 8, wherein the base station is located within a cellular radio access network (RAN) of the cellular network that interconnects to the cellular network core of the cellular network.

13. The system of claim 12, wherein the UAV command and control signal is routed exclusively within the cellular RAN after being received over the first air interface and prior to being transmitted over the second air interface.

14. The system of claim 12, wherein a signaling path of the UAV command and control signal extends through the cellular RAN and bypasses the cellular network core.

15. One or more computer storage devices storing computer-executable instructions that, upon execution by a processor, cause the processor to perform the following operations:
receiving, by a base station of a cellular network, an unmanned aerial vehicle (UAV) command and control signal over a first air interface extending between the base station and a UAV controller, the UAV command and control signal carrying instructions for controlling a flight parameter of a UAV; and
transmitting, by the base station, the UAV command and control signal over a second air interface extending between the base station and the UAV without routing the UAV command and control signal through a cellular network core of the cellular network, the UAV authenticating the UAV controller before using the UAV command and control signal to control the flight parameter of the UAV.

16. The one or more computer storage devices of claim 15, wherein the cellular network comprises a fifth generation (5G) standalone architecture (SA) cellular network.

17. The one or more computer storage devices of claim 15, wherein the operations further comprise:
authenticating, by the UAV, the UAV controller; and
based on at least authenticating the UAV controller, trusting, by the UAV, the UAV command and control signal.

18. The one or more computer storage devices of claim 15, wherein the base station is located within a cellular radio access network (RAN) of the cellular network that interconnects to the cellular network core of the cellular network.

19. The one or more computer storage devices of claim 18, wherein the UAV command and control signal is routed exclusively within the cellular RAN after being received over the first air interface and prior to being transmitted over the second air interface.

20. The one or more computer storage devices of claim 18, wherein a signaling path of the UAV command and control signal extends through the cellular RAN and bypasses the cellular network core.

* * * * *